United States Patent
Yoon

(10) Patent No.: US 8,345,801 B2
(45) Date of Patent: Jan. 1, 2013

(54) APPARATUS AND METHOD FOR SIGNAL MISMATCH COMPENSATION IN A WIRELESS RECEIVER

(76) Inventor: Weon-Ki Yoon, Plano, TX (US)

( * ) Notice: Subject to any disclaimer, the term of this patent is extended or adjusted under 35 U.S.C. 154(b) by 1049 days.

(21) Appl. No.: 11/271,017

(22) Filed: Nov. 10, 2005

(65) Prior Publication Data

US 2007/0104291 A1    May 10, 2007

(51) Int. Cl.
*H04L 27/00* (2006.01)
(52) U.S. Cl. ........ 375/324; 375/375; 375/319; 375/344; 375/345; 329/304
(58) Field of Classification Search .................. 375/324, 375/332, 375, 319, 344, 345; 329/304
See application file for complete search history.

(56) References Cited

U.S. PATENT DOCUMENTS

| | | | | |
|---|---|---|---|---|
| 5,150,384 | A * | 9/1992 | Cahill | 375/375 |
| 6,310,513 | B1 * | 10/2001 | Iemura | 329/304 |
| 7,002,407 | B2 * | 2/2006 | Hunton et al. | 330/52 |
| 2002/0057752 | A1 * | 5/2002 | Denno | 375/346 |
| 2003/0231723 | A1 * | 12/2003 | Hansen | 375/343 |
| 2004/0037377 | A1 * | 2/2004 | Brobston et al. | 375/345 |
| 2004/0066861 | A1 * | 4/2004 | Song et al. | 375/316 |
| 2004/0219884 | A1 * | 11/2004 | Mo et al. | 455/67.11 |
| 2005/0075815 | A1 * | 4/2005 | Webster et al. | 702/106 |
| 2005/0238114 | A1 * | 10/2005 | Ishikawa et al. | 375/298 |

OTHER PUBLICATIONS

Carni et al., "Carrier Frequency and Phase Offset Measurement for Single Carrier Digital Modulation", 2004, Instrument and Measurement Technology Conference 2004 IMTC 04 Proceedings of the 21st IEEE, vol. 1, pp. 413-418.*

* cited by examiner

*Primary Examiner* — Shuwang Liu
*Assistant Examiner* — Sung Ahn

(57) ABSTRACT

A system and method for signal mismatch compensation in a wireless receiver is disclosed. The method includes receiving an in-phase (I) signal and a quadrature (Q) signal corresponding to the I signal, the Q signal having an ideal phase offset of 90 degrees from the I signal, where there is a phase and gain mismatch between the I signal and Q signal. The method adjusts the phase offset between the I signal and the Q signal to minimize the IQ power, where the IQ power is the average-time power of a digital baseband in-phase (DB-I) signal and a digital baseband quadrature (DB-Q) signal, corresponding to the I signal and Q signal, respectively. The method adjusts the gain of the Q signal to minimize the IQ power, whereby the phase and gain mismatch between the I signal and Q signal is minimized.

21 Claims, 7 Drawing Sheets

APPARATUS AND METHOD FOR SIGNAL MISMATCH COMPENSATION IN A WIRELESS RECEIVER

TECHNICAL FIELD OF THE INVENTION

The present application relates generally to wireless networks and, more specifically, to an apparatus and method for signal mismatch compensation.

BACKGROUND OF THE INVENTION

A conventional heterodyne receiver architecture includes a radio-frequency (RF) mixer in the front-end modulating the RF input to an intermediate frequency (IF). Because an RF mixer is sensitive to both sidebands around the local oscillator (LO) carrier frequency, two mixers are typically employed that are driven by LO clocks having a 90 degree phase difference, producing quadrature baseband output signals referred to as the in-phase (I) signal and quadrature (Q) signal, which is phase-shifted by 90 degrees from the I signal. By complex adding or subtracting the quadrature baseband output signals, the desired sideband can be selected while the undesired sideband (image) is suppressed. The suppression of the images is very sensitive to the phase mismatch of the LO phase shifter and the gain mismatch of the RF mixer.

In some conventional systems, an IQ compensation block is used to correct for this phase and gain mismatch. One known IQ compensation block compensates gain and phase mismatch using the following equation:

$$[I \ Q]_{compensated} = [I \ Q]_{in} \begin{bmatrix} 1 & -\tan\theta \\ 0 & \frac{1}{\alpha\cos\theta} \end{bmatrix},$$

where the $[I\,Q]_{in}$ values are the in-phase and quadrature input signals, the $[I\,Q]_{compensated}$ values are the output signals of the IQ compensation block, the $\theta$ value is the phase mismatch, and the $\alpha$ value is the gain mismatch. Such an implementation requires an IQ compensation block with computation of $\tan\theta$ and $1/(\alpha\cos\theta)$ from phase mismatch $\theta$ and gain mismatch $\alpha$. This computation can be undesirably complicated, and is typically a one-time calibration method in the final stages of factory assembly, or a manual adjustment.

Therefore, there is a need in the art for an improved wireless network that includes an apparatus and method for signal mismatch compensation in a digital IF image rejection receiver.

SUMMARY OF THE INVENTION

A method for signal mismatch compensation in a wireless receiver comprising receiving an in-phase (I) signal and a quadrature (Q) signal corresponding to the I signal, the Q signal having an ideal phase offset of 90 degrees from the I signal; where there is a phase and gain mismatch between the I signal and Q signal; adjusting the phase offset between the I signal and the Q signal to minimize the IQ power, where the IQ power is the average-time power of a digital baseband in-phase (DB-I) signal and a digital baseband quadrature (DB-Q) signal, corresponding to the I signal and Q signal, respectively; and adjusting the gain of the Q signal to minimize the IQ power, whereby the phase and gain mismatch between the I signal and Q signal is minimized.

A wireless receiver processing circuit is also provided. The wireless receiver processing circuit includes a digital IQ demodulator (DIQDEM) connected to receive a digital in-phase (I) signal and a digital quadrature (Q) signal corresponding to the I signal, the Q signal having an ideal phase offset of 90 degrees from the I signal, where there is a phase and gain mismatch between the I signal and Q signal, wherein the DIQDEM produces a digital baseband in-phase (DB-I) signal and a digital baseband quadrature (DB-Q) signal, corresponding to the I signal and Q signal, respectively. The wireless receiver processing circuit also includes an IQ power measurement component configured to measure the average-time power of the DB-I signal and the DB-Q signal. The wireless receiver processing circuit also includes an IQ mismatch compensation component configured to adjust the phase offset between the I signal and the Q signal to minimize the IQ power, where the IQ power is the average-time power of a digital baseband in-phase (DB-I) signal and a digital baseband quadrature (DB-Q) signal, corresponding to the I signal and Q signal, respectively, whereby the phase mismatch between the I signal and Q signal is minimized.

A mobile station is also provided. The mobile station includes a processor and receiver processing circuitry. The receiver processing circuitry includes a digital IQ demodulator (DIQDEM) connected to receive a digital in-phase (I) signal and a digital quadrature (Q) signal corresponding to the I signal, the Q signal having an ideal phase offset of 90 degrees from the I signal, where there is a phase and gain mismatch between the I signal and Q signal, wherein the DIQDEM produces a digital baseband in-phase (DB-I) signal and a digital baseband quadrature (DB-Q) signal, corresponding to the I signal and Q signal, respectively. The receiver processing circuitry also includes an IQ power measurement component configured to measure the average-time power of the DB-I signal and the DB-Q signal. The receiver processing circuitry also includes an IQ mismatch compensation component configured to adjust the phase offset between the I signal and the Q signal to minimize the IQ power, where the IQ power is the average-time power of a digital baseband in-phase (DB-I) signal and a digital baseband quadrature (DB-Q) signal, corresponding to the I signal and Q signal, respectively, whereby the phase mismatch between the I signal and Q signal is minimized.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Various embodiments include an automatic IQ mismatch compensation apparatus and method, which can be implemented in a base station and/or mobile station in a wireless network. In one implementation, a numerically-controlled oscillator (NCO) uses phase mismatch correction and a digital I/Q demodulation (DIQDEM) block corrects gain mismatch. Some embodiments do not require an IQ compensation block using the computation of $\tan \theta$ and $1/(\alpha \cos \theta)$ from phase mismatch $\theta$ and gain mismatch $\alpha$, as in prior art implementations.

Figure 1:
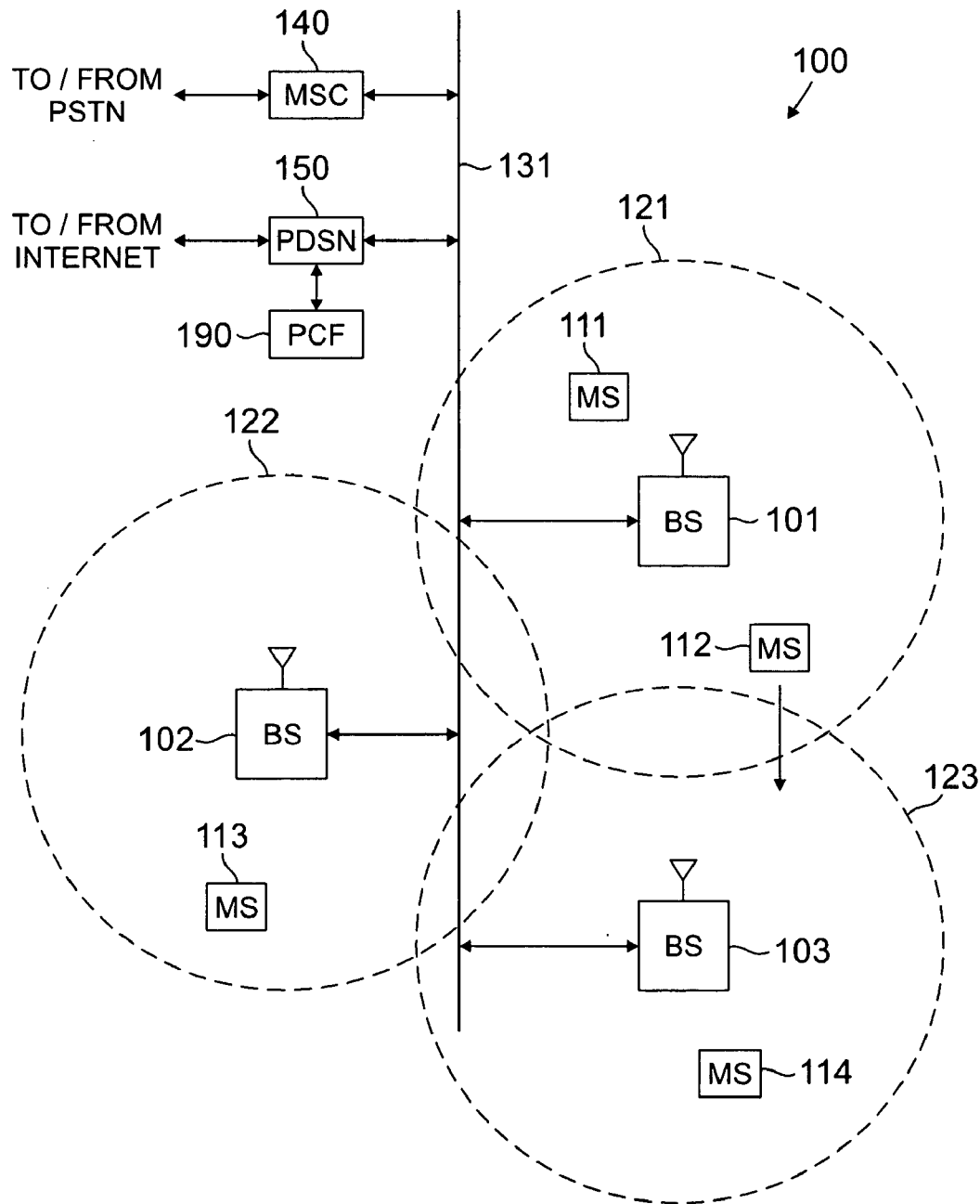
FIG. 1 illustrates an exemplary wireless network in which base stations and mobile stations can incorporate the various embodiments of the present disclosure.

FIG. 1 illustrates exemplary wireless network 100, in which base stations and mobile stations can incorporate the various embodiments of the present disclosure. Wireless network 100 comprises a plurality of cells (or cell sites) 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). It is important to note, however, that the receiver technology disclosed herein is not limited to this CDMA implementation, and indeed can be advantageously used in any number of different types of wireless networks, including CDMA, OFDMA, GSM, TDMA, and many others, as will be understood by those of skill in the art. In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals and other devices that incorporate receivers or transceivers in which IQ mismatch is an issue. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability), and other devices. Additionally, in other wireless network architectures, the term "mobile station" may be replaced by an alternative term, such as "subscriber station" or "mobile terminal," or the like. The use of such alternative terms for similar devices should not be construed so as to narrow the scope of the present disclosure.

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas and/or base stations in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet or other data network (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In exemplary wireless network 100, MS 111 is located in cell 121 and is in communication with BS 101. MS 112 is also located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

Figure 2:
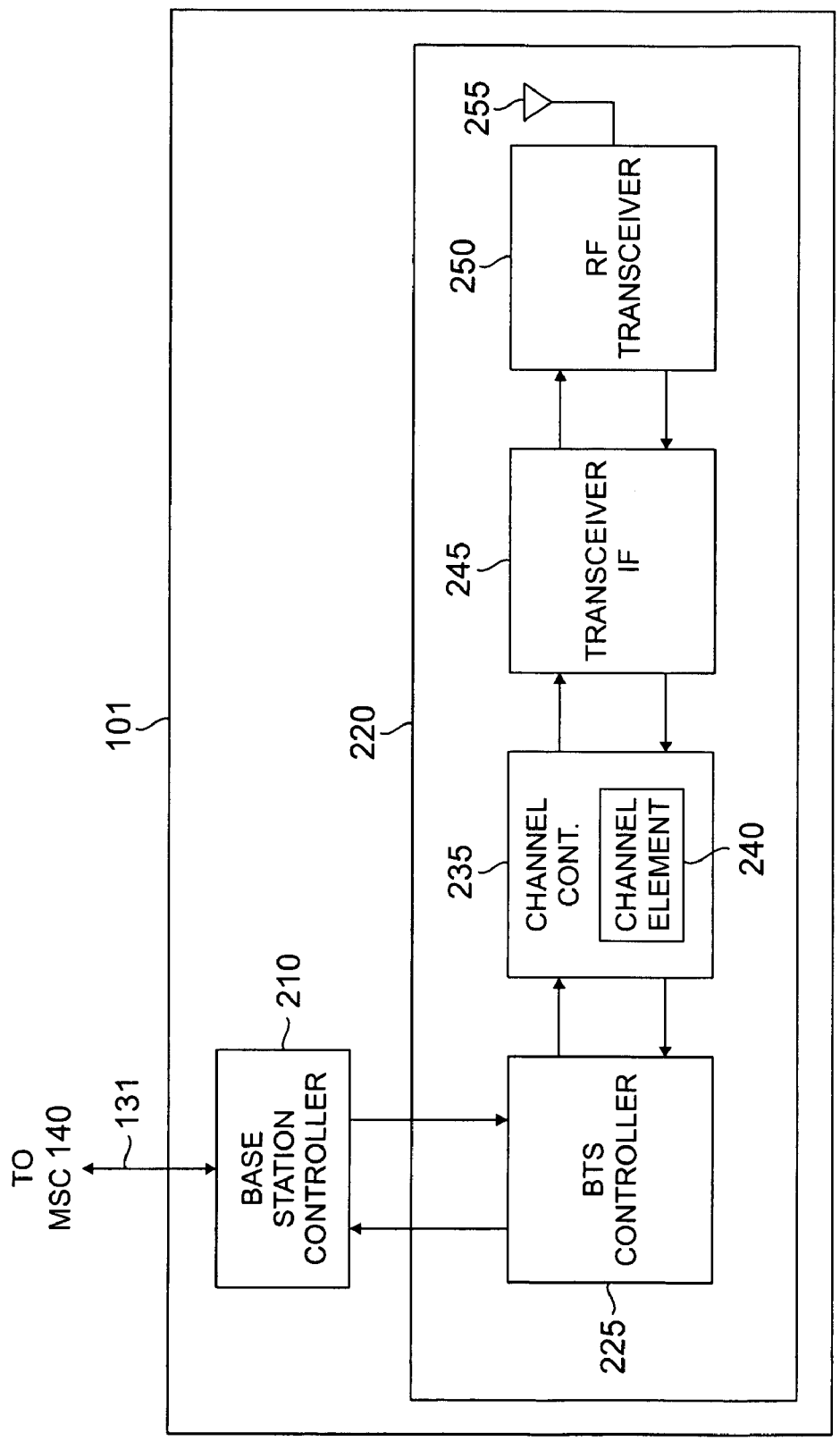
FIG. 2 illustrates an exemplary base station of FIG. 1 in greater detail according to an exemplary embodiment of the present disclosure.

FIG. 2 illustrates exemplary base station 101 in greater detail according to an exemplary embodiment of the present disclosure. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235 (which contains representative channel element 240), transceiver interface (IF) 245, RF transceiver 250, and antenna array 255. As described in more detail below, the RF transceiver unit 250 includes conventional elements such as a low-noise amplifier (LNA) and RF IQ demodulator, for processing incoming RF signals. The transceiver IF 245 includes digital IQ mismatch compensation as described in further detail below.

BTS controller 225 comprises processing circuitry and memory capable of executing an operating program that controls the overall operation of BTS 220 and communication with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 235 and RF transceiver 250.

Antenna array 255 transmits forward channel signals received from RF transceiver 250 to mobile stations in the coverage area of BS 101. Antenna array 255 also sends to RF transceiver 250 reverse channel signals received from mobile stations in the coverage area of BS 101. In a preferred embodiment of the present disclosure, antenna array 255 is multi-sector antenna, such as a three-sector antenna in which each antenna sector is responsible for transmitting and receiving in a 120 degree arc of coverage area. Additionally, RF transceiver 250 may contain an antenna selection unit to select among different antennas in antenna array 255 during both transmit and receive operations.

Figure 3:
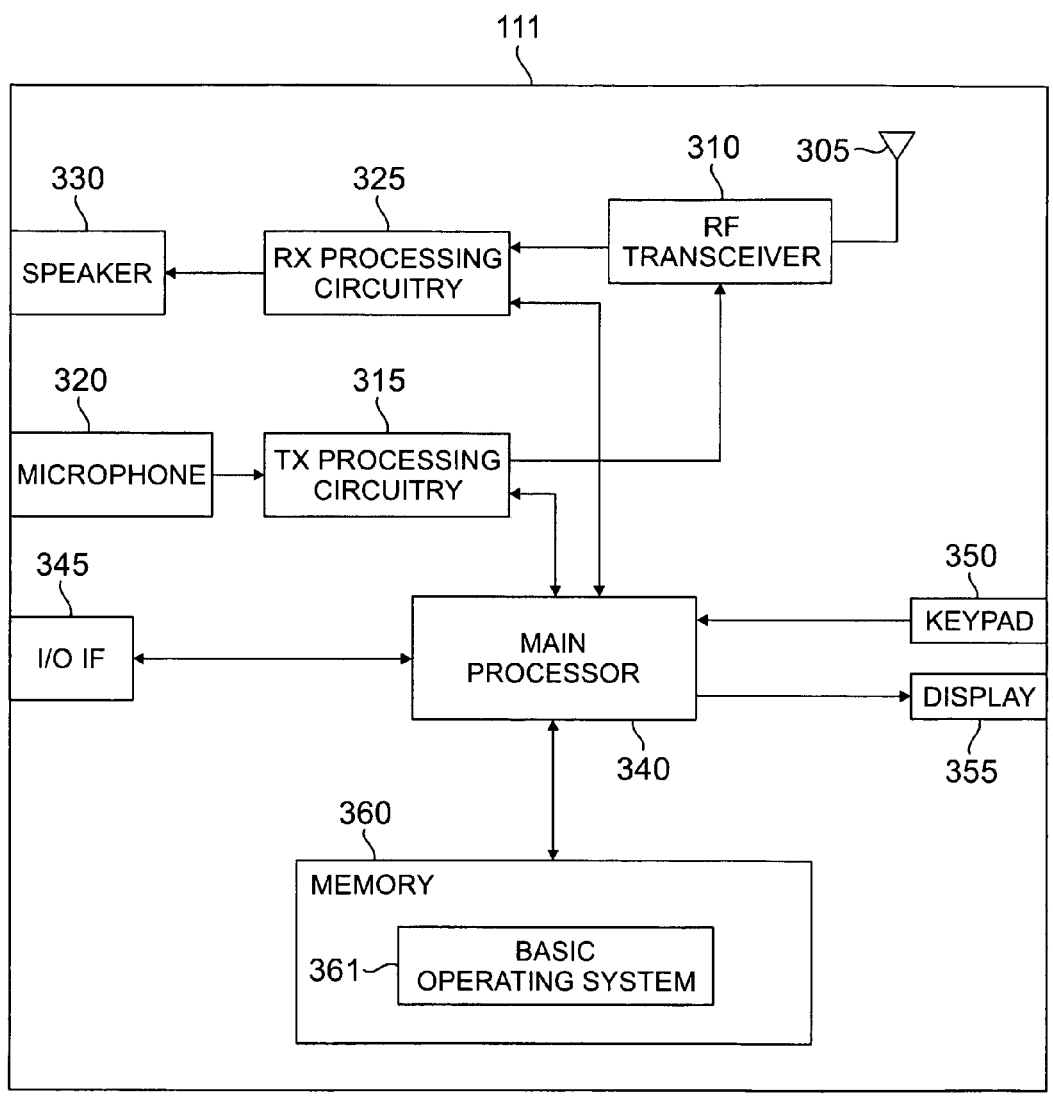
FIG. 3 illustrates a wireless mobile station of FIG. 1 according to an exemplary embodiment of the present disclosure.

FIG. 3 illustrates wireless mobile station 111 according to an advantageous embodiment of the present disclosure. Wireless mobile station 111 comprises antenna 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system (OS) program 361.

As described in more detail below, the RF transceiver 310 includes conventional elements such as a low-noise amplifier (LNA) and RF IQ demodulator, for processing incoming RF signals. The RX processing circuitry 325 includes digital IQ mismatch compensation as described in additional detail below.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In an advantageous embodiment of the present disclosure, main processor 340 is a microprocessor or microcontroller. Memory 360 is coupled to main processor 340. According to an advantageous embodiment of the present disclosure, part of memory 360 comprises a random access memory (RAM) and another part of memory 360 comprises a non-volatile memory, such as Flash memory, which acts as a read-only memory (ROM).

Main processor 340 executes basic operating system (OS) program 361 stored in memory 360 in order to control the overall operation of wireless mobile station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. Main processor 340 is also coupled to I/O interface 345. I/O interface 345 provides mobile station 111 with the ability to connect to other devices such as laptop computers and handheld computers. I/O interface 345 is the communication path between these accessories and main processor 340.

Main processor 340 is also coupled to keypad 350 and display unit 355. The operator of mobile station 111 uses keypad 350 to enter data into mobile station 111. Display 355 may be a liquid crystal display capable of rendering text and/or at least limited graphics from web sites. Alternate embodiments may use other types of displays.

Figure 4:
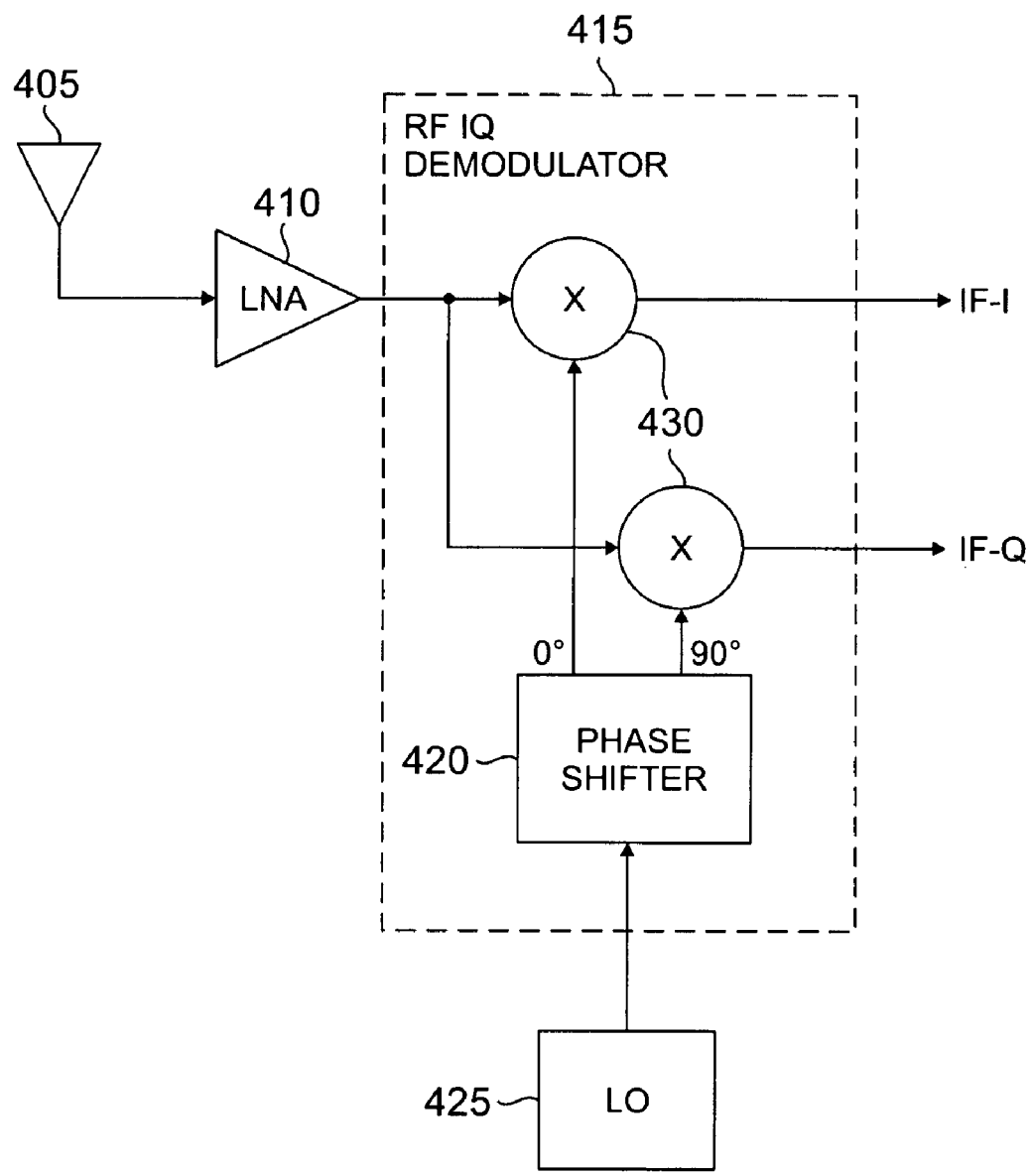
FIG. 4 depicts an RF front end as may be conventionally used in a receiver/transceiver in a base station, wireless mobile station, or other receiver, in accordance with an exemplary embodiment of the present disclosure.

FIG. 4 depicts radio-frequency (RF) front-end circuitry as may be conventionally used in a receiver or transceiver in a base station 101, a mobile station 111, or other receiver, in accordance with various embodiments of the present disclosure. FIG. 4 illustrates antenna 405, which may correspond to antenna 305 or all or part of antenna array 255. Low-noise amplifier (LNA) 410 amplifies the incoming RF signal received from antenna 405. The amplified RF signal from LNA 410 is input to RF IQ demodulator 415.

RF IQ demodulator 415 demodulates the amplified RF signal to intermediate frequency (IF) in-phase (I) and quadrature (Q) signals. RF IQ demodulator 415 also receives a reference signal from local oscillator (LO) 425, which is processed by phase shifter 420 to produce two output sinusoidal signals having a 90 degree phase difference. These output sinusoidal signals are each combined in mixer 430 with the amplified RF signal from LNA 410 to produce the IF in-phase (I) signal and the IF quadrature (Q) signal. Ideally, the IF-Q signal is phase-shifted by 90 degrees from the IF-I signal ideally. In reality, in such a conventional RF front end, there is both a phase mismatch, θ, and a gain mismatch, α, between the IF-I and IF-Q signals.

LNA 410, RF IQ demodulator 415, and LO 425 can be implemented in RF transceiver 250 of base station 101, in RF transceiver 310 of wireless mobile station 111, or in other similar receivers or transceivers.

Figure 5:
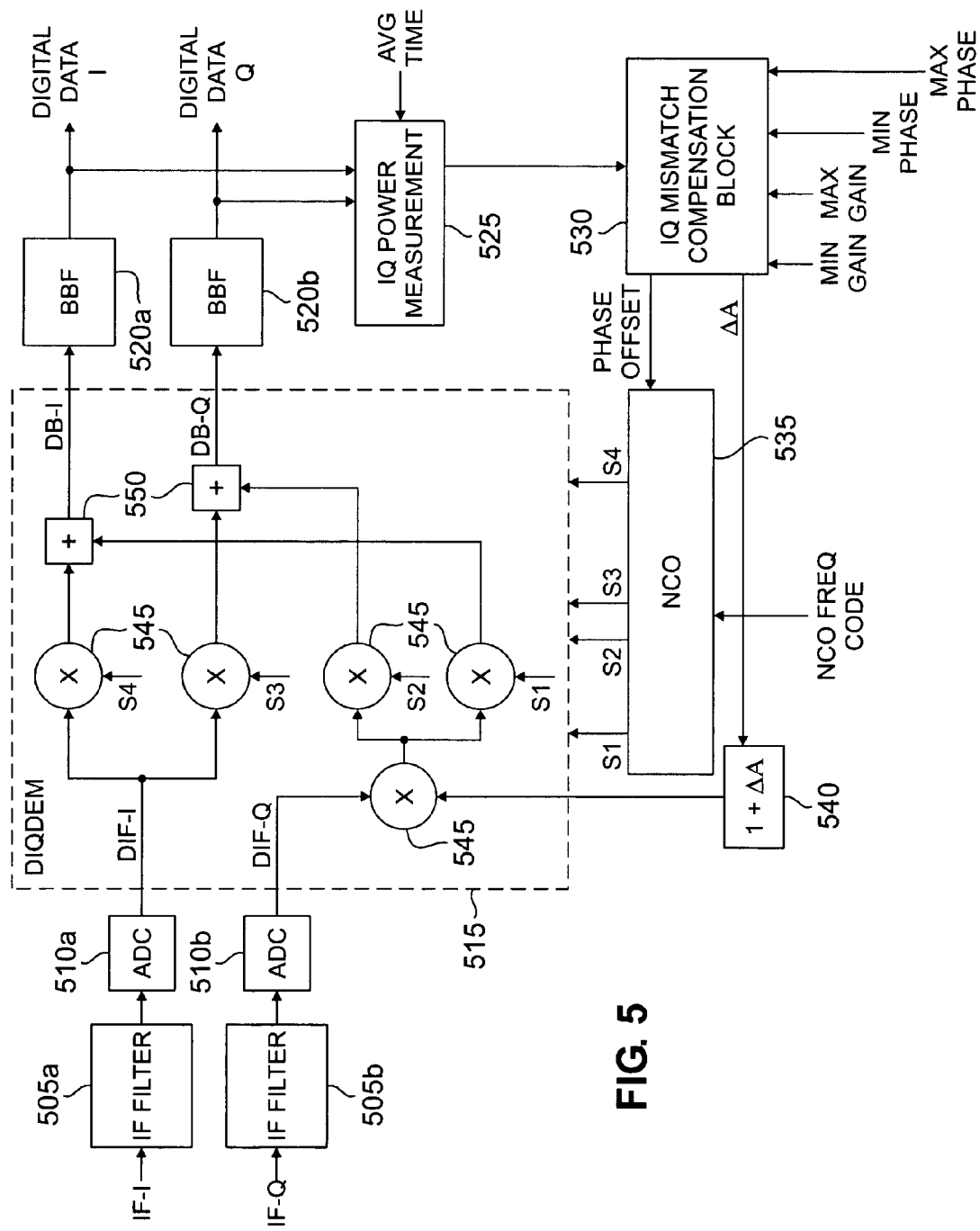
FIG. 5 depicts a high-level block diagram of a wireless receiver processing circuit according to an exemplary embodiment of the invention.

FIG. 5 depicts a high-level block diagram of a wireless receiver processing circuit according to an exemplary embodiment of the invention. This receiver includes a quadrature receiver suitable for use in, for example, base station 101 or wireless mobile station 111. The wireless receiver processing circuit includes IF filters 505*a* and 505*b*, analog-to-digital converters (ADCS) 510*a* and 510*b*, digital I/Q demodulation (DIQDEM) block 515, baseband filters (BBFS) 520*a* and 520*b*, IQ power measurement block 525, IQ mismatch compensation block 530, and numerical controlled oscillator (NCO) block 535. DIQDEM block 515 includes Weaver image rejection circuitry and techniques.

IF filters 505*a* and 505*b* filter the IF signals, IF-I and IF-Q, output by RF IQ demodulator 415 to eliminate or reduce any unwanted signals and noise. The IF-I and IF-Q signals are digitized by ADC 510*a* and ADC 510*b* to produce digital IF signals, DIF-I and DIF-Q, respectively. The DIF-I and DIF-Q signals are demodulated by DIQDEM block 515 to produce digital I and Q baseband signals DB-I and DB-Q and suppress image signals.

DIQDEM block 515 includes five multipliers 545 and two adders 550. Baseband filters 520*a* and 520*b* remove the unwanted signals of the demodulated baseband signals, DB-I and DB-Q, and IQ power measurement block 525 measures the power of the filtered baseband signals digital data I and digital data Q at average time, N, where N is the number of digital I or Q data samples. The value of average time, N, is programmable. The following equations can be used for the power measurements at average time, N:

$$\text{Power1} = \frac{1}{N}\sum_{n=1}^{N}(I_n^2 + Q_n^2) \text{ or } \text{Power2} = \frac{1}{N}\sum_{n=1}^{N}\sqrt{I_n^2 + Q_n^2}$$

Figure 7:
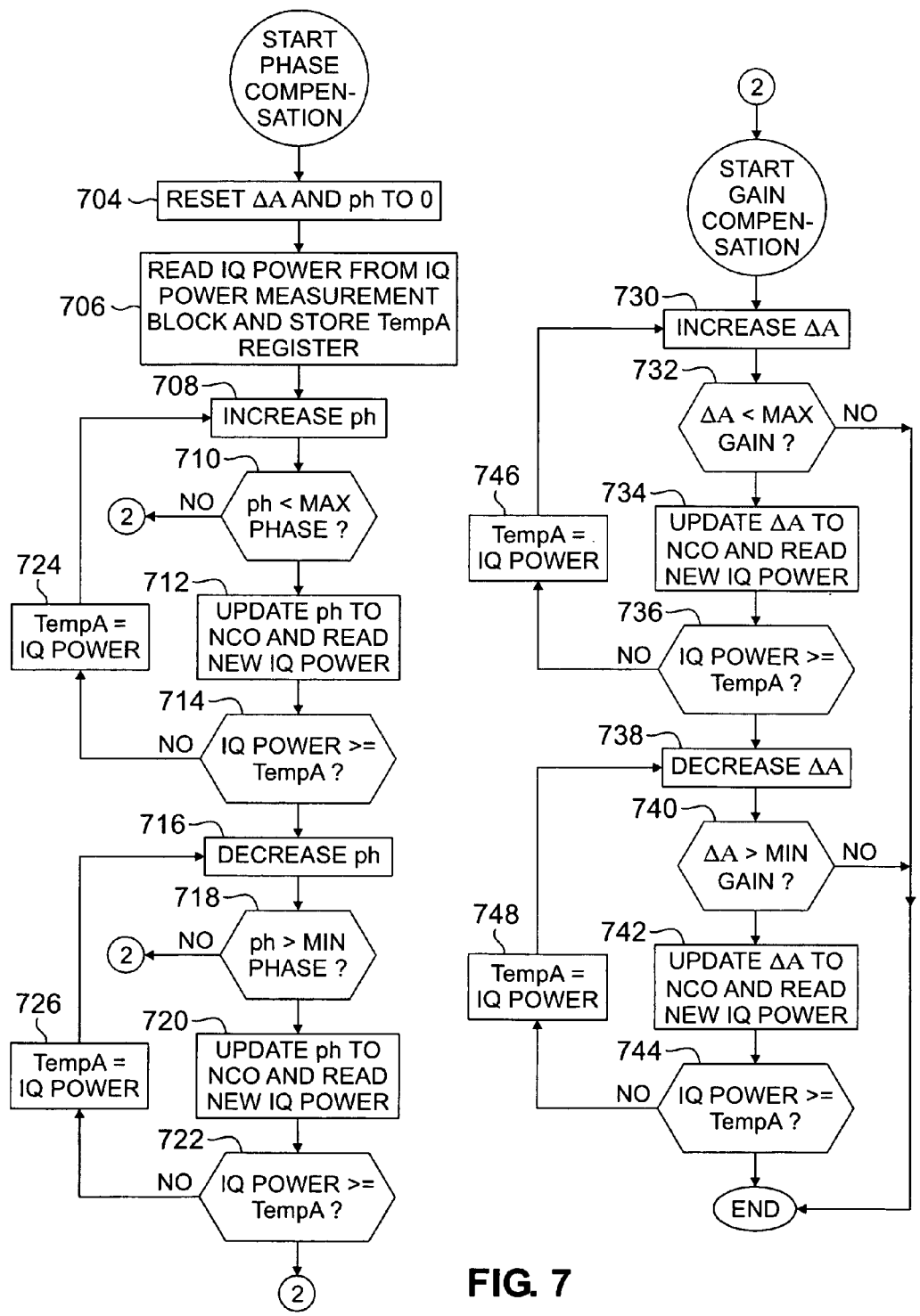
FIG. 7 depicts a flowchart of the operation of an IQ mismatch compensation block, in accordance with an exemplary embodiment of the present disclosure.

The measured result of IQ power measurement block 525 is input to IQ mismatch compensation block 530 to extract the mismatch of phase, θ, and gain, α. FIG. 7, described below, shows the flowchart of IQ mismatch compensation block 530. IQ mismatch compensation block 530 increases or decreases Phase Offset and adjusts gain, ΔA, to minimize the IQ power measured by IQ power measurement block 525. IQ mismatch compensation block 530 is controlled by the programmable values Min Gain, Max Gain, Min Phase and Max Phase. The Min Gain and Max Gain values function as minimum and maximum gain thresholds, and the Min Phase and Max Phase values function as minimum and maximum phase offset thresholds.

The outputs, Phase Offset and ΔA, of IQ mismatch compensation block 530 control the phase of numerically controlled oscillator (NCO) 535 and the gain of the DIF-Q path in DIQDEM block 515, respectively. The output of gain control (1+ΔA) block 540 of IQ mismatch compensation block is input to DIQDEM block 515 to compensate for gain mismatch by adjusting the gain of DIF-Q.

NCO 535 receives Phase Offset and an NCO frequency code (NCO Freq Code), described below, and generates four signals: S1=sin(2πfdt); S2=cos(2πfdt); S3=sin(2πft+ph); and S4=cos(2πfdt+ph).

As can be seen, DIQDEM block 515 mixes and adds various signals to produce the DB-I and DB-Q signals. Signal S1 is combined with gain-adjusted DIF-Q by mixer 545. Signal S4 is combined with the DIF-I signal by mixer 545. The resulting signals are combined by adder 550 to produce the DB-I signal. Similarly, signal S2 is combined with the gain-adjusted DIF-Q signal by mixer 545 and signal S3 is combined with the DIF-I signal by mixer 545, and the resulting signals are combined by adder 550 to produce the DB-Q signal.

Figure 6:
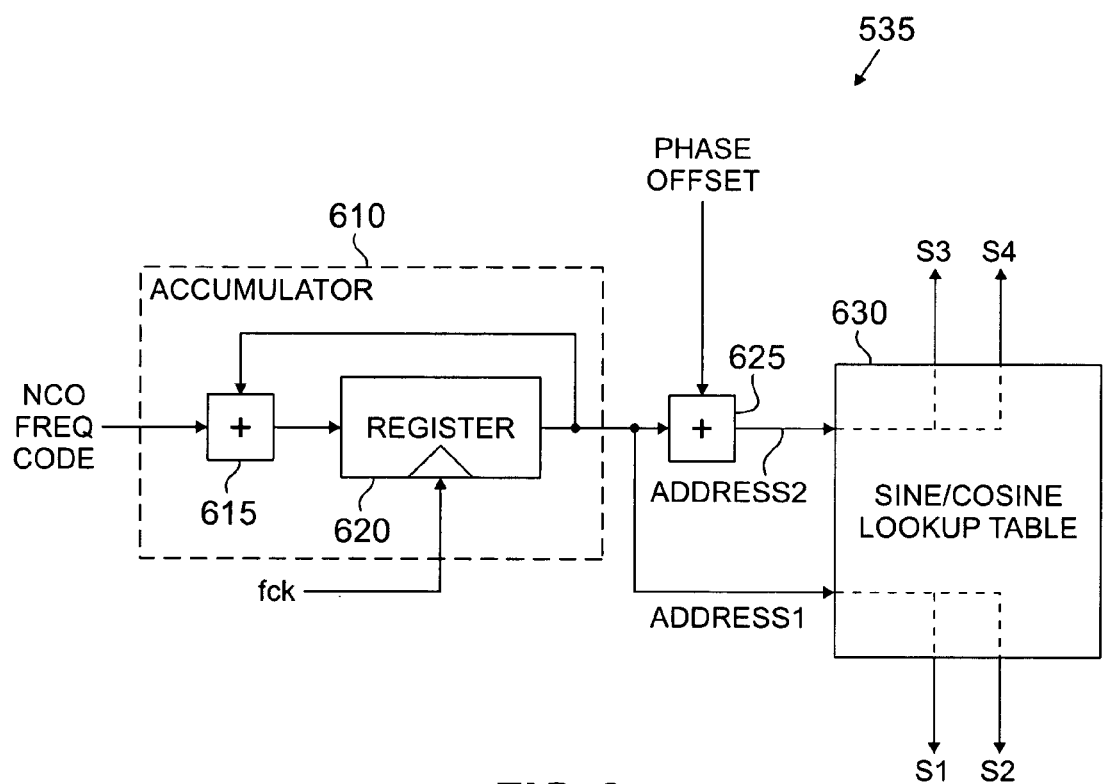
FIG. 6 depicts a detailed block diagram of a numerically controlled oscillator in accordance with an exemplary embodiment of the disclosure.

FIG. 6 depicts a detailed block diagram of NCO 535 in accordance with an embodiment of the disclosure. NCO 535 comprises accumulator 610, adder 625, and sine/cosine lookup table 630. Accumulator 610 comprises adder 615 and register 620.

The number of NCO Freq Code is calculated by the following equation:

$$\text{NCO Freq Code} = 2^n * \frac{fd}{fck}$$

where the value, n, is the number of bits in register 620 of accumulator 610, the value, fd, is the digital IF frequency, and the value, fck, is the frequency of the sampling clock of NCO block 535. NCO Freq Code is combined with the output Address1 at adder 615 and the sum is stored in register 620, which is in turn controlled by the fck clock.

The output, Address1, of accumulator 610 is applied to sine/cosine lookup table 630 to produce S1=sin(2πfdt) and S2=cos(2πfdt)data at the fck rate. The output, Address 1, of accumulator 610 also is applied to adder 625 and addes to the Phase Offset value to produce the value, Address2, which is applied to sine/cosine lookup table 630 to produce S3=sin(2πfdt+ph) and S4=cos(2πfdt+ph) data at the fck rate.

FIG. 7 depicts a flowchart of the operation of IQ mismatch compensation block 530, in accordance with an exemplary embodiment of the present disclosure. This process increases or decrease Phase Offset to minimize the IQ power measured by IQ power measurement block 525 and then adjusts gain ΔA to further minimize the IQ power. As noted above, the values, Min Gain, Max Gain, Min Phase and Max Phase, are programmable.

IQ mismatch compensation block 530 first performs phase compensation. IQ mismatch compensation block 530 initially resets the values of ΔA and Phase Offset to zero (step 704). IQ mismatch compensation block 530 reads IQ power from IQ power measurement block 525 and stores the value in TempA register (step 706). IQ mismatch compensation block 530 then increase Phase Offset (step 708) and tests if Phase Offset is less than the Max Phase value (step 710). If not, the process proceeds to the gain compensation procedure.

If Phase Offset is less than the Max Phase value, IQ mismatch compensation block 530 updates Phase Offset to NCO 535 and reads the new IQ power (step 712). IQ mismatch compensation block 530 then determines if the IQ power is greater than or equal to TempA (the stored IQ power) (step 714). If it is not, then TempA is set to the current IQ power (step 724) and the process returns to step 708.

If the IQ power is greater than or equal to TempA, IQ mismatch compensation block 530 decreases the Phase Offset value (step 716), then determines if the Phase Offset value is greater than the Min Phase value (step 718). If not, the process proceeds to the gain compensation procedure.

If the Phase Offset value is greater than the Min Phase value, IQ mismatch compensation block 530 updates the Phase Offset value to NCO 535 and reads the new IQ power (step 720). IQ mismatch compensation block 530 then determines if the IQ power is greater than or equal to TempA (the stored IQ power) (step 722). If it is not, then TempA is set to the current IQ power (step 726), and the process returns to step 716. If the IQ power is greater than or equal to the TempA value, the process proceeds to the gain compensation procedure.

In the gain compensation procedure, IQ mismatch compensation block 530 increases the ΔA value (step 730) and determines whether the ΔA value is less than the Max Gain value (step 732). If it is not, the process ends. If the ΔA value is less than the Max Gain value, IQ mismatch compensation block 530 updates the ΔA value to NCO 535 and reads the new IQ power (step 734).

IQ mismatch compensation block 530 then determines whether the current IQ power is greater than or equal to TempA (the stored IQ power) (step 736). If it is not, then the current IQ power is stored as TempA (step 746), and the process returns to step 730.

If IQ power is greater than or equal to the TempA value, the IQ mismatch compensation block 530 decreases the ΔA value (step 738), then determines whether the ΔA value is greater than the Min Gain value. If it is not, the process ends. If the ΔA value is greater than the Min Gain value, IQ mismatch compensation block 530 updates the ΔA value to NCO 535 and reads the new IQ power (step 742). IQ mismatch compensation block 530 determines whether the current IQ power is greater than or equal to TempA (the stored IQ power) (step 744). If it is not, then the current IQ power is stored as TempA (step 748), and the process returns to step 738.

At this point, IQ mismatch compensation block 530, in combination with the rest of the circuit illustrated in FIG. 5, has fully adjusted both the phase and gain to compensate for any IQ mismatch, using the phase adjustment, Phase Offset, and the gain adjustment, ΔA, and the process ends.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method, comprising:
    receiving an in-phase (I) signal and a quadrature (Q) signal corresponding to the I signal, the Q signal having an ideal phase offset of 90 degrees from the I signal, wherein there is a phase and gain mismatch between the I signal and the Q signal;
    iteratively adjusting, based on a comparison between a current IQ power and a past IQ power, a phase offset between the I signal and the Q signal to minimize an IQ power, wherein the IQ power is the average-time power of a digital baseband in-phase (DB-I) signal and a digital baseband quadrature (DB-Q) signal, corresponding to the I signal and the Q signal, respectively;
    adjusting a gain of the Q signal to minimize the IQ power;
    generating with a numerically-controlled oscillator (NCO) a first sine signal and a first cosine signal based on a frequency code; and
    generating with the NCO a second sine signal and a second cosine signal based on the frequency code and the phase offset, wherein the DB-I signal is generated based on the first sine signal and the second cosine signal, and wherein the DB-O signal is generated based on the first cosine signal and the second sine signal.

2. The method of claim 1, wherein the phase offset is adjusted between a maximum and minimum threshold.

3. The method of claim 2, wherein the gain of the Q signal is adjusted between a maximum and minimum threshold.

4. The method of claim 1, wherein the IQ power is read and updated as the phase offset is adjusted.

5. The method of claim 1, wherein the IQ power is read and updated as the gain of the Q signal is adjusted.

6. The method of claim 1, wherein the frequency code comprises $$2^n * \frac{fd}{fck},$$

the first sine signal comprises sin(2πfdt), the first cosine signal comprises cos(2πfdt), the second sine signal comprises sin(2πfdt+ph), and the second cosine signal comprises cos(2πfdt+ph), wherein fd is a digital IF frequency, fck is a frequency of a sampling clock, t is equal to n/fck, n is an integer number, and ph is the phase offset.

7. A wireless receiver processing circuit, comprising:
    a digital IQ demodulator (DIQDEM) configured to receive a digital in-phase (I) signal and a digital quadrature (Q) signal corresponding to the I signal, the Q signal having an ideal phase offset of 90 degrees from the I signal, wherein there is a phase and gain mismatch between the I signal and the Q signal, wherein the DIQDEM is further configured to produce a digital baseband in-phase (DB-I) signal and a digital baseband quadrature (DB-Q) signal, corresponding to the I signal and the Q signal, respectively;

an IQ power measurement component configured to measure an IQ power, wherein the IQ power is an average-time power of the DB-I signal and the DB-Q signal;

an IQ mismatch compensation component configured to iteratively adjust, based on a comparison between a current IQ power and a past IQ power, a phase offset between the I signal and the Q signal to minimize the IQ power and configured to adjust a gain of the Q signal to minimize the IQ power; and a numerically-controlled oscillator (NCO) configured to generate a first sine signal and a first cosine signal based on a frequency code and to generate a second sine signal and a second cosine signal based on the frequency code and the phase offset, wherein the DIQDEM is configured to produce the DB-I signal based on the first sine signal and the second cosine signal and to produce the DB-Q signal based on the first cosine signal and the second sine signal.

8. The wireless receiver processing circuit of claim 7, wherein the frequency code comprises $$2^n * \frac{fd}{fck},$$

fd is a digital IF frequency, fck is a frequency of a sampling clock, and n is an integer number.

9. The wireless receiver processing circuit of claim 8, wherein the first sine signal comprises sin(2πfdt) and the first cosine signal comprises cos(2πfdt), and wherein t is equal to n/fck.

10. The wireless receiver processing circuit of claim 9, wherein the second sine signal comprises sin(2πfdt+ph) and the second cosine signal comprises cos(2πfdt+ph), and wherein ph is the phase offset.

11. The wireless receiver processing circuit of claim 7, further comprising a baseband filter configured to filter the DB-I signal.

12. The wireless receiver processing circuit of claim 7, wherein the DB-I signal and the DB-Q signal correspond to the output of the wireless receiver processing circuit.

13. The wireless receiver processing circuit of claim 7, wherein the IQ mismatch compensation component is configured to adjust the phase offset between a minimum phase and a maximum phase.

14. The wireless receiver processing circuit of claim 7, wherein the IQ mismatch compensation component is configured to adjust the gain of the Q signal between a minimum gain and a maximum gain.

15. A mobile station capable of communicating in a wireless network, comprising:

a processor; and receiver processing circuitry, having a digital IQ demodulator (DIQDEM) configured to receive a digital in-phase (I) signal and a digital quadrature (Q) signal corresponding to the I signal, the Q signal having an ideal phase offset of 90 degrees from the I signal, wherein there is a phase and gain mismatch between the I signal and the Q signal, wherein the DIQDEM is further configured to produce a digital baseband in-phase (DB-I) signal and a digital baseband quadrature (DB-Q) signal, corresponding to the I signal and the Q signal, respectively, an IQ power measurement component configured to measure an IQ power, wherein the IQ power is an average-time power of the DB-I signal and the DB-Q signal, an IQ mismatch compensation component configured to iteratively adjust, based on a comparison between a current IQ power and a past IQ power, a phase offset between the I signal and the Q signal to minimize the IQ power and configured to adjust a gain of the Q signal to minimize the IQ power, and a numerically-controlled oscillator (NCO) configured to generate a first sine signal and a first cosine signal based on a frequency code and to generate a second sine signal and a second cosine signal based on the frequency code and the phase offset, wherein the DIADEM is configured to produce the DB-I signal based on the first sine signal and the second cosine signal and to produce the DB-Q signal based on the first cosine signal and the second sine signal.

16. The mobile station of claim 15, wherein the frequency code comprises $$2^n * \frac{fd}{fck},$$

fd is a digital IF frequency, fck is a frequency of a sampling clock, and n is an integer number.

17. The mobile station of claim 16, wherein the first sine signal comprises sin(2πfdt) and the first cosine signal comprises cos(2πfdt), and wherein t is equal to n/fck.

18. The mobile station of claim 17, wherein the second sine signal comprises sin(2πfdt+ph) and the second cosine signal comprises cos(2πfdt+ph), and wherein ph is the phase offset.

19. The mobile station of claim 15, the receiver processing circuitry further comprising a baseband filter configured to filter the DB-I signal.

20. The mobile station of claim 15, wherein the IQ mismatch compensation component is configured to adjust the phase offset between a minimum phase and a maximum phase.

21. The mobile station of claim 15, wherein the IQ mismatch compensation component is configured to adjust the gain of the Q signal between a minimum gain and a maximum gain.

* * * * *

UNITED STATES PATENT AND TRADEMARK OFFICE
CERTIFICATE OF CORRECTION

| | | |
|---|---|---|
| PATENT NO. | : 8,345,801 B2 | Page 1 of 1 |
| APPLICATION NO. | : 11/271017 | |
| DATED | : January 1, 2013 | |
| INVENTOR(S) | : Weon-Ki Yoon | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this
Fourth Day of November, 2014

Michelle K. Lee
*Deputy Director of the United States Patent and Trademark Office*